United States Patent [19]

Finney et al.

[11] Patent Number: 5,712,856
[45] Date of Patent: Jan. 27, 1998

[54] METHOD AND APPARATUS FOR TESTING LINKS BETWEEN NETWORK SWITCHES

[75] Inventors: Damon W. Finney, San Jose, Calif.; Michael James Rayfield, Tucson, Ariz.

[73] Assignee: International Business Machines Corporation, Armonk, N.Y.

[21] Appl. No.: 749,880

[22] Filed: Nov. 15, 1996

Related U.S. Application Data

[63] Continuation of Ser. No. 419,213, Apr. 10, 1995, abandoned.

[51] Int. Cl.$^6$ .................. G01R 31/28; G06F 11/00
[52] U.S. Cl. .................. 371/20.1; 371/68.2; 395/183.2; 364/265.1; 364/944.5
[58] Field of Search ............ 371/20.1, 20.4, 371/20.5, 61, 67.1, 68.2; 395/185.08, 185.09, 183.19, 183.2, 183.1; 370/14, 15, 16, 16.1, 242, 248, 249; 379/5; 264/265.1, 944.5

[56] References Cited

U.S. PATENT DOCUMENTS

| | | | |
|---|---|---|---|
| 3,787,810 | 1/1974 | Wiggins et al. | 370/15 |
| 3,934,224 | 1/1976 | Dulaney et al. | 371/20.1 |
| 4,242,750 | 12/1980 | Finck et al. | 371/22 |
| 4,271,513 | 6/1981 | Maejima et al. | 371/22 |
| 4,380,810 | 4/1983 | Canniff | 370/20.5 |
| 4,611,320 | 9/1986 | Southard | 370/13 |
| 4,685,102 | 8/1987 | Lewis | 370/15 |
| 4,763,315 | 8/1988 | Nakayashiki et al. | 371/15 |
| 5,060,226 | 10/1991 | Gewin et al. | 371/20.5 |
| 5,081,666 | 1/1992 | Blachek et al. | 379/5 |
| 5,187,732 | 2/1993 | Suzuki | 379/5 |

FOREIGN PATENT DOCUMENTS

| | | |
|---|---|---|
| 0324886 | 7/1989 | European Pat. Off. . |
| 0510822 | 10/1992 | European Pat. Off. . |
| 0085437 | 8/1993 | European Pat. Off. . |
| 2-284545 | 11/1990 | Japan . |
| 3-52396 | 3/1991 | Japan . |
| 3-268545 | 11/1991 | Japan . |
| 5-158902 | 6/1992 | Japan . |
| 9222967 | 12/1992 | WIPO . |

*Primary Examiner*—Robert W. Beausoliel, Jr.
*Assistant Examiner*—Trinh Tu
*Attorney, Agent, or Firm*—Raymond M. Galasso; Jenkens & Gilchrist; Leslie G. Murray

[57] ABSTRACT

A test link protocol which continuously monitors each link in a network to ensure that the link is correctly transmitting data. Each switch, or torus has at least one of two functional components: Send Test and Receive Test. The Send Test component monitors control codes at a torus link output. The Receive Test component monitors control codes at a torus link input. After a predetermined interval, the Send Test component makes a request to send a test_link control code. The torus sends the test_link code to the neighboring torus, where it is removed from the data stream and sent to that torus' Receive Test. The Receive Test then generates a response message and makes a request to send that message back to the originating torus. After receiving the message, the Send Test analyzes the message to determine whether the network link is working correctly. An error is also declared if the Send Test does not receive a reply within a predetermined interval.

19 Claims, 6 Drawing Sheets

METHOD AND APPARATUS FOR TESTING LINKS BETWEEN NETWORK SWITCHES

This application is a continuation of application Ser. No. 08/419,213, filed on Apr. 10, 1995, which was abandoned upon the filing hereof.

TECHNICAL FIELD OF THE INVENTION

This invention pertains in general to data transmitting networks and more particularly to an error detection protocol for detecting errors between network switches.

BACKGROUND OF THE INVENTION

Large scale data processing networks typically comprise many different switches separated by communication links. Each switch is linked to one or more other switches. These switches constantly receive and transmit data. Data transmission protocols are used to ensure that data passes through the network without error.

Data transmission protocols typically rely on control codes to ensure that all switches and links are functioning correctly. For example, a transmitting switch will send a code indicating that data has been transmitted and a receiving switch will send a reply acknowledging that data was received. The transmitting switch will expect to receive the acknowledgement within a pre-determined time period. Otherwise, a timeout error occurs.

Often, a timeout error is the first indication of network failure. Such an error, however, does not indicate what the error was or isolate the part of the network that failed. Thus, it is difficult for a switch or network administrator to determine which part of the network has failed. Moreover, switches waste valuable time waiting for a never-arriving acknowledgement code.

Therefore, it is an object of the present invention to provide a method and apparatus for quickly determining when a network error has occurred.

It is another object of the present invention to provide a method and apparatus for quickly determining where a network error has occurred.

It is yet another object of the present invention to provide a method and apparatus for isolating the location of a network error.

SUMMARY OF THE INVENTION

These and other objects are achieved according to the present invention by a test link protocol which continuously monitors each link in the network to ensure that the link is correctly following a higher level protocol. Each torus, or switch, is connected to at least one other torus by a pair of uni-directional links, one sending link and one receiving link. Each sending link is connected to the receiving link of another torus and vice-versa. Each torus has at least one of two functional components: Send Test and Receive Test. The Send Test component monitors control codes at the torus link output. The Receive Test component monitors control codes at the torus link input. The test link protocol is implemented for each pair of links in the network and tests each pair separately.

After a predetermined interval, the Send Test component automatically makes a request to send a test_link control code. The torus sends the test_link code to the neighboring torus, where it is removed from the data stream and sent to that torus' Receive Test. The Receive Test then generates a response message and makes a request to send that message back to the originating torus. After receiving the message, the Send Test analyzes the message to determine whether the network link is working correctly. If an error is detected, the Send Test issues an error message and shuts down the network link that the message used. An error message is also sent if the Send Test does not receive a reply within a predetermined interval.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The present invention can be used in any network in which multiple switches are connected by logical data channels. For example, the invention can be implemented in a large network having thousands of switches and connections or in a small network connecting computer peripherals to the system bus of a computer system.

Figure 1:
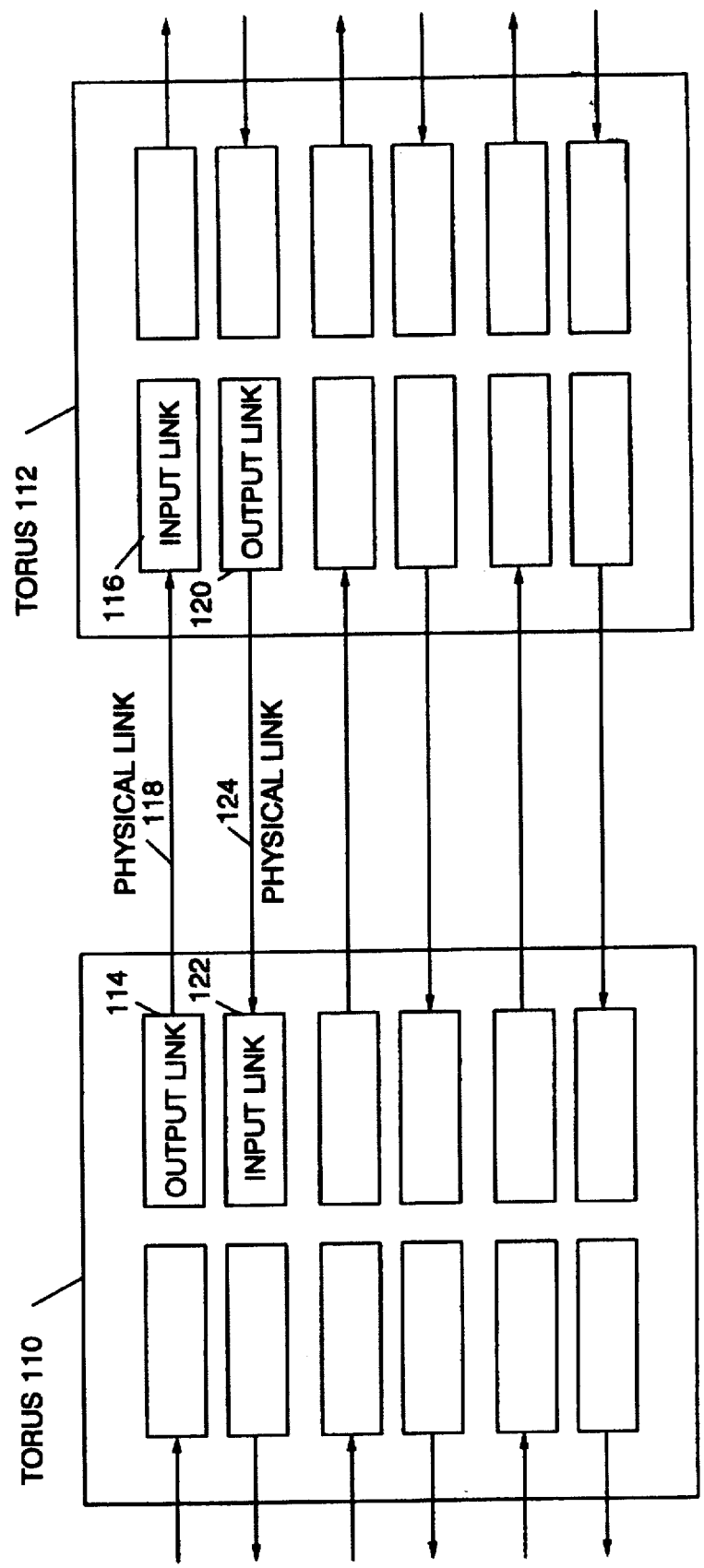
FIG. 1 depicts a typical configuration of a torus-switch link interconnection.

FIG. 1 shows a typical configuration of interconnected tori. A "torus" is a cross-point switch used to transmit information across a network. Two tori are shown 110, 112. Torus 110 has an Output Link 114 connected to torus 112's Input Link 116 via physical link 118. Likewise, torus 112's Output Link 120 is connected to torus 110's Input Link 122 via physical link 124.

A pair of interconnected Input/Output Links 114, 116, 120, 122 forms a logical data channel. The links themselves 118, 124 are herein referred to as "physical links," but may in fact be based upon any form of data transmission. Thus, the Input/Output Links 114, 116, 120, 122 need not be physically connected. Each torus 110, 112 sends messages to the other torus via its Output Link 114, 120. The messages follow a specific protocol. The protocol, in turn, is composed of control codes. The control codes provide information such as the size of the message or what action the receiving torus is to perform on the message.

Figure 2:
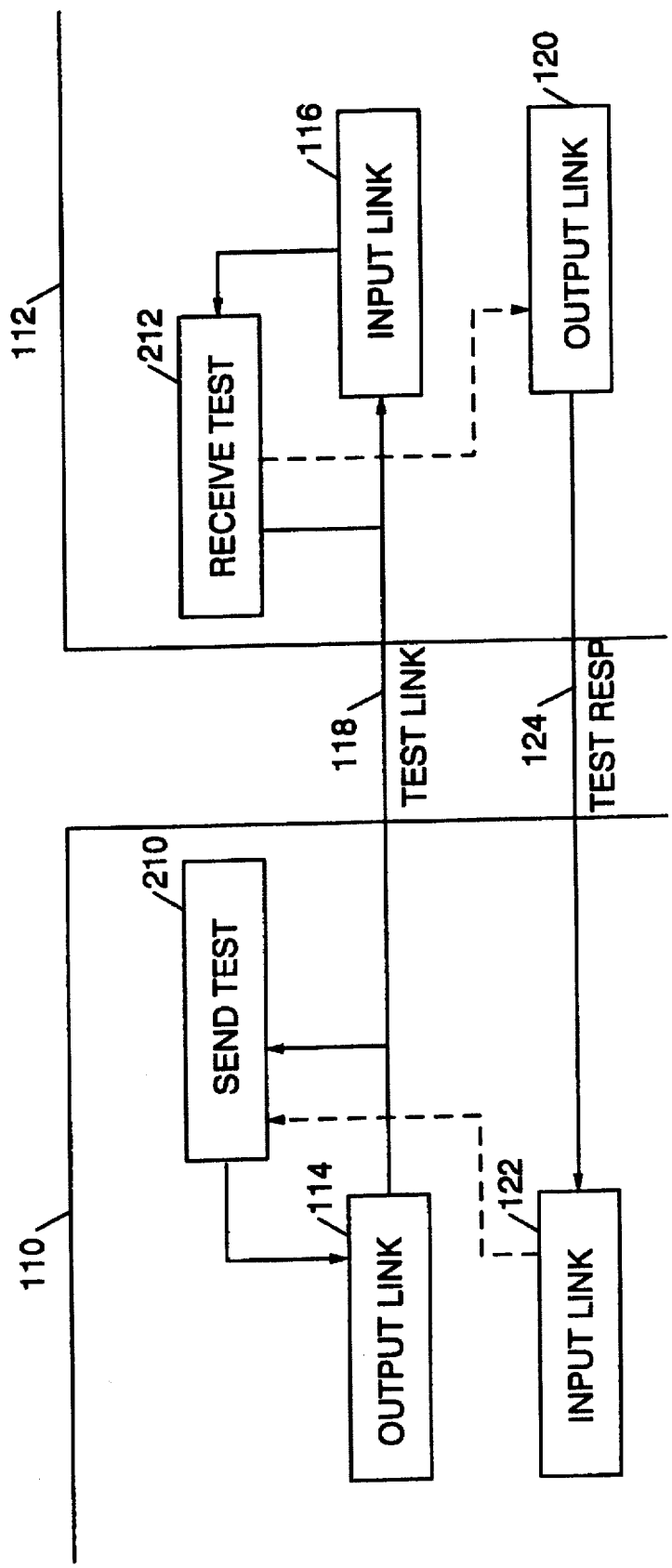
FIG. 2 depicts a detailed view of a pair of input/output links connecting two tori.

FIG. 2 shows a detailed view of a pair of Input/Output links connecting the tori 110, 112 of FIG. 1. Also shown are the Send 210 and Receive 212 Test functional components. These two components 210, 212 are present for every pair of links 118, 124 between tori. The Send 210 and Receive 212 Test functional components implement the test link protocol between the tori.

Each Output Link 114, 120 sends data from its respective torus 110, 112 over a physical link 118, 124 to the Input Link 116, 122 of the other torus 112, 110. Output Links 114, 120 also process and act on requests from the Send 210 and Receive 212 Test components to send messages to the other torus.

Input Links 116, 122 receive data from their respective physical links 118, 124. In addition, the Input Links 116, 122 detect certain control codes, remove those codes from the data streams, and then notify either Send 210 or Receive 212 Test of the codes' arrival. For example, Input Link 116 detects and removes test_link control codes from the data stream and notifies Receive Test 212 of their arrival. Further operation of the Input 116, 122 and Output Links 114, 120 is described below.

Send Test 210 is connected to torus 110 such that it can monitor messages sent over physical link 118, send messages to Output Link 114 and receive messages from Input Link 122. Send Test 210 has three main functions: monitor control codes; determine when to send a test_link message to Receive Test 212; and compare the state of Receive Test 212 to its own state.

Send Test 210 monitors control codes sent by Output Link 114 over physical link 118. Send Test 210 uses a state machine to track these codes. The actual configuration of the state machine is dependant upon the protocol used by the network. Since the state machine will be used for error detecting, however, both Send Test 210 and Receive Test 212 must use identical state machines.

Figure 3:
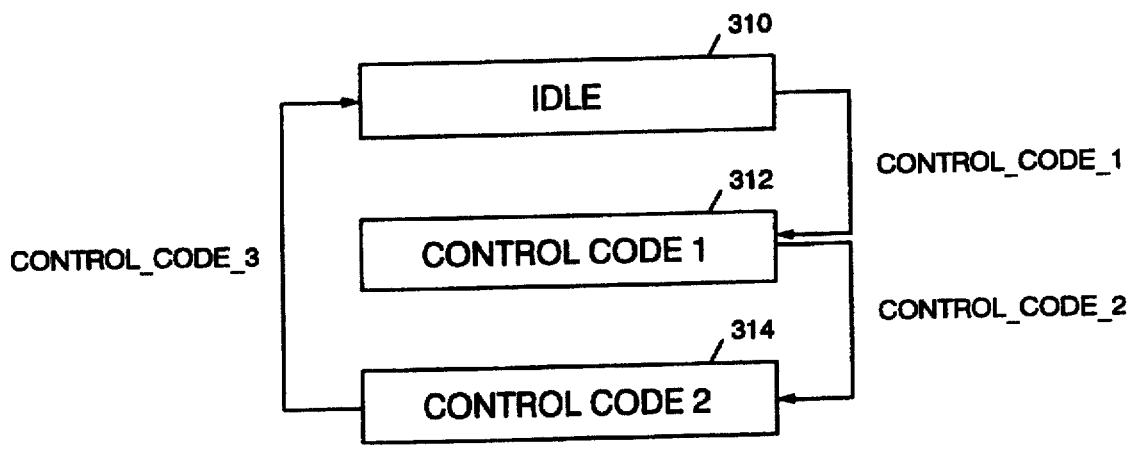
FIG. 3 depicts a sample state machine for tracking control codes.

FIG. 3 shows a sample state machine for tracking control codes. This state machine has three possible states: "idle" 310; "control code one" 312; and "control code two" 314. The state machine transitions to each state when it detects the corresponding control code. For example, the state changes from "idle" 310 to "control code one" 312 when Output Link 114 sends a control_code_1 over physical link 118.

Send Test 210 determines when to send a test_link message to Receive Test 212. The messages can be sent after any predetermined time interval, but the best mode is described herein. If no message traffic is on physical link 118, Send Test 210 requests that Output Link 114 send a test_link every 65,536 clock cycles. If a message is on physical link 118, Send Text 210 requests a test_link 64 cycles after the beginning of the message. Output Link 114 sends the test_link message to Receive Test 212 as soon as traffic permits.

Receive Test 212 has two main purposes: monitor control codes carried by physical link 118 and send the current status of Receive Test 212's state machine to Send Test 210 in response to a test_link message.

Receive Test 212 is connected to physical link 118 such that it can monitor control codes sent on the link. Receive Test implements a state machine like that shown in FIG. 3 and updates it according to the control codes it detects.

When Input Link 116 receives a test_link message, it notifies Receive Test 212 of the message. In response, Receive Test 212 formulates a rcv_test_response message containing the current state of the Receive Test 212 state machine. Next, Receive Test 212 requests that Output Link 120 send the rcv_test_response message. Output Link 120 sends the rcv_test_response message to Input Link 122 via physical link 124.

Send Test 210 then compares the state of Receive Test 212 with that of itself. In normal operation, both test components 210, 212 should be in the same state because they implement the same state machine. If the components 210, 212 are in different states, a network error has occurred. In addition, an error occurs if a rcv_test_response message is not received by Send Test 210 within a predetermined time interval.

Send Test

Figure 4:
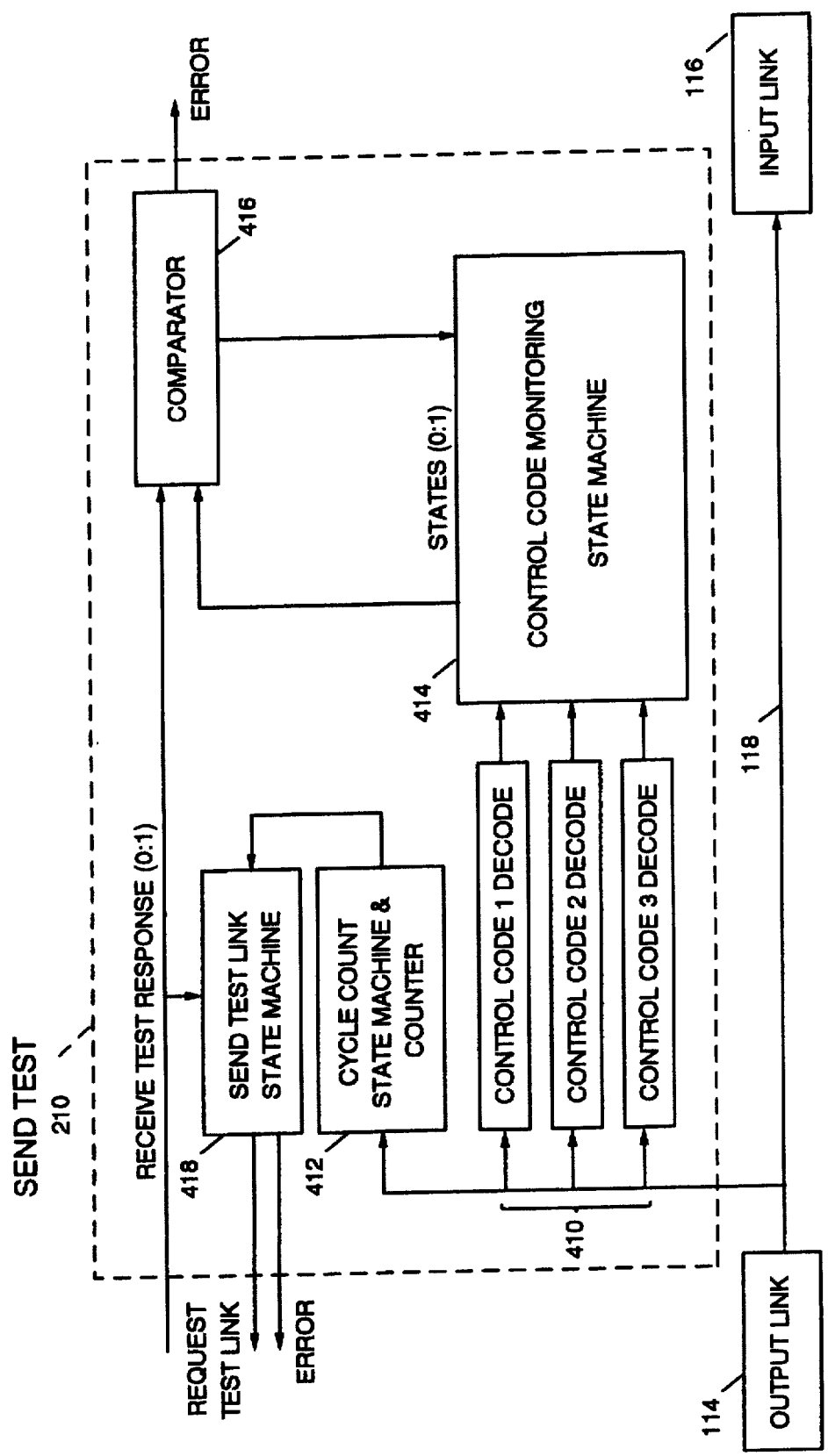
FIG. 4 depicts a detailed view of the logical blocks in the Send Test component.

FIG. 4 depicts a detailed view of the logical blocks in Send Test 210. A decoder 410 and a counter 412 are connected to physical link 118. Decoder 410 is connected to a Control Code Monitoring State Machine ("CCMSM") 414, which, in turn, is connected to a comparator 416. Counter 412 is connected to a Send Test Link State Machine ("STLSM") 418. A system clock, which generates clock cycles, is also present but not shown.

Decoder 410 monitors and decodes control codes sent over physical link 118. The control codes are then sent to CCMSM 414. CCMSM 414 implements a state machine like that shown in FIG. 3.

Figure 5:
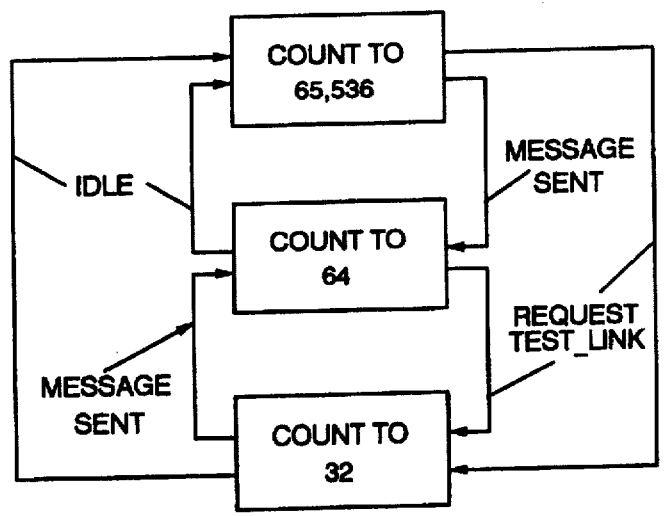
FIG. 5 depicts a state machine used to determine the maximum count of the Send Test counter.

Counter 412 counts clock cycles. The limit of Counter 412 is determined using the state machine shown in FIG. 5. If a message has been sent on physical link 118, Counter 412's maximum count is 64 cycles from the beginning of the message. If STLSM 418 has requested that a test_link control code be sent, Counter 412's maximum count is 32. Otherwise, Counter 412's maximum is 65,536. When Counter 412 reaches its maximum count, it sends a signal to STLSM 418.

Figure 6:
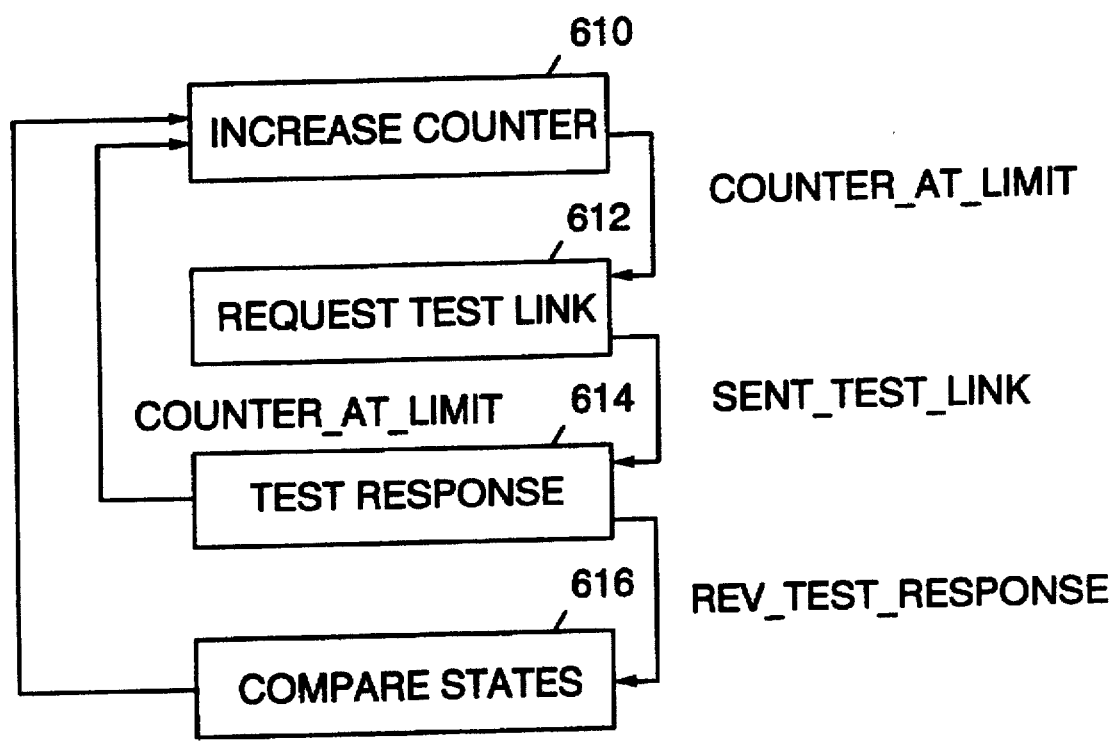
FIG. 6 depicts a state machine used to control the behavior of the Send Test component.

STLSM 418 determines when to request that a test_link message be sent and whether a network error has occurred. STLSM 418 implements the state machine shown in FIG. 6. The state machine has four states: "increase counter" 610; "request test_link" 612; "test response" 614; and "compare states" 614.

STLSM 418's state machine remains at "increase counter" state 610 until it receives a counter_at_limit signal from counter 412. Then, the state machine transitions to "request test_link" state 612. At state 612, STLSM 418 sends a signal to Output Link 114 requesting that a test_link message be sent over physical link 118. Also at state 612, STLSM 418 sets Counter 412 to 32. Then, STLSM 418 transitions to "test response" state 614.

At state 614, the state machine waits for either a rcv_test_response signal from Input Link 122 or a counter_at_limit signal from counter 412. If a rcv_test_response signal is received, the state machine transitions to "compare states" state 614 and then back to "increase counter" state 610. A counter_at_limit signal received while at state 614 indicates that 32 cycles have elapsed since the test_link message was sent. Therefore, an error has occurred because a response from torus 112 was not received within 32 cycles.

Comparator 416 compares the state of Receive Test 212 with that of Send Test 210. Comparator 416 receives signals from Input Link 122 and from CCMSM 414. The state of Receive Test 212 is embedded in the rcv_test_response signal received from Input Link 122. Using these two signals, comparator 416 compares the state of Receive Test 212 with the state of CCMSM 414. If the states are different and STLSM 418 is in the compare states state 614, then a control code has been lost and a network error has occurred.

Receive Test

Figure 7:
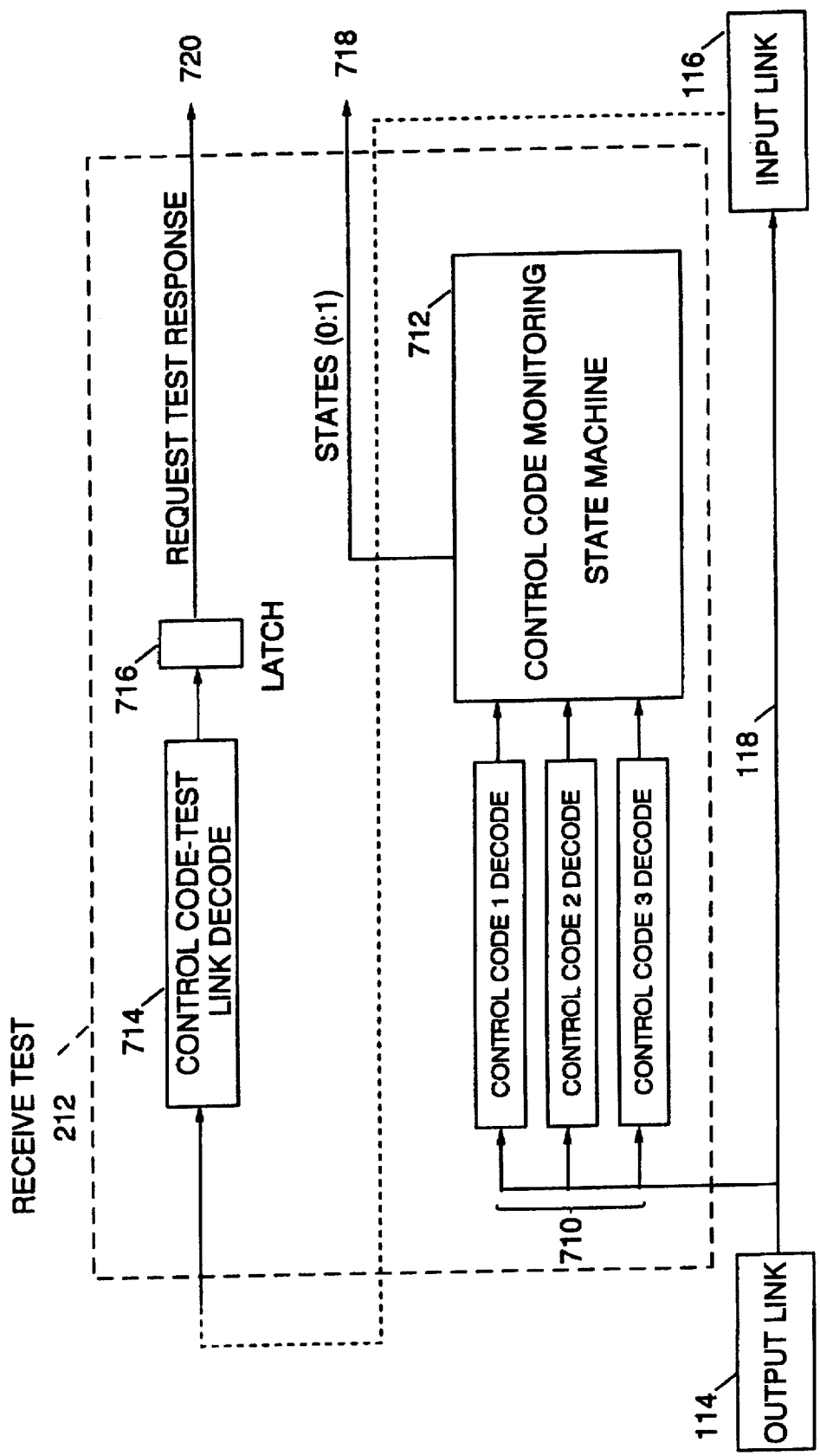
FIG. 7 depicts a detailed view of the logical blocks in the Receive Test component.

FIG. 7 depicts a detailed view of the logical blocks in Receive Test 212. A decoder 710 is connected to physical link 118. Decoder 710 is also connected to a CCMSM 712. Input Link 116 is connected to a Control Code Test Link Decoder ("CCTLD") 714. CCTLD 714, in turn, is connected to a latch 716. Both CCMSM 712 and latch 716 have outputs 718, 720 connected to Output Link 120 (not shown in FIG. 7). A system clock, which generates clock cycles, is also present but not shown.

Decoder 710 monitors and decodes control codes sent over physical link 118. The decoded codes are then sent to CCMSM 712. CCMSM 712 implements a state machine like that of FIG. 3. In addition, CCMSM 712 has an output 718 indicating its current state. This output 718 is connected to Output Link 120.

CCTLD 714 decodes test_link signals received by Input Link 116. A test_link signal lasts for only one cycle and, thus, so does CCTLD 714's output signal. Therefore, CCTLD 714 sends its output to latch 716. Latch 716's output creates a one cycle pulse which requests that Output Link 120 send a rcv_test_response message over physical link 124. When traffic permits, Output Link 120 sends a rcv_test_response message containing the state of control code monitoring state machine 712.

The rcv_test_response message is received by Input Link 122. Input Link 122 detects and removes the message from the data stream and passes its contents to Send Test 210. As discussed above, Send Test 210 then uses the message to compare the states of Send Test 210 and Receive Test 212.

When Send Test 210 determines that a network error has occurred, it will normally shut down the logical communication channel on which the error occurred or perform another predetermined action such as reset the logical channel or notify a network supervisor. Of course, other channels can still be used to send messages through the network.

Although the present invention and its advantages have been described in detail, it should be understood that various changes, substitutions and alterations can be made herein without departing from the spirit and scope of the invention as defined by the appended claims.

What is claimed is:

1. A network having an error detection protocol, said network comprising:

a first switch;

a second switch linked to said first switch;

a send test component having a plurality of states associated with said first switch for sending messages, in response to said states, to said second switch and comparing messages received from said second switch with said messages sent by said send test component to detect network errors;

a receive test component associated with said second switch for responding to messages received from said send test component;

counter means, said counter means associated with said send test component, for determining when to send messages to said second switch and when to determine when a reply should be received from said second switch, said counter means including means for prompting said send test component to send said messages after a maximum count and means for prompting said send test component to wait for said reply from said second switch after said maximum count; and wherein said counter means further includes means for changing said maximum count from a first count to a second count in response to said states of said send test component.

2. The network of claim 1, further comprising:

a first state associated with said send test component; and a second state associated with said receive test component, wherein said receive test component sends said second state to said first switch and said send test component compares said second state with said first state to detect said network errors.

3. The network of claim 1, wherein said first and second switches are torus switches.

4. The network of claim 1, further comprising:

error handling means for controlling said first and second switches when said network errors are detected.

5. The network of claim 4, wherein said error handling means further comprises:

means for shutting down said network when said network errors are detected.

6. The network of claim 4, wherein said error handling means further comprises:

means for resetting said network when said network errors are detected.

7. The network of claim 4, wherein said error handling means further comprises:

means for notifying a network supervisor when said network errors are detected.

8. The network of claim 1, further comprising:

a first input/output link associated with said first switch, said first input/output link having a first input link and a first output link; and a second input/output link associated with said second switch, said second input/output link having a second input link and a second output link, said first output link connected to said second input link by a uni-directional connection and said second output link connected to said first input link by a uni-directional connection.

9. The network of claim 8, wherein said uni-directional connections are physical links.

10. A method of error detection in a network having a first switch and a second switch, comprising the steps of:

sending a message from said first switch to said second switch after a first time;

determining, in response to said message, a state of a receive test component associated with said second switch;

replying to said message by sending said state of said receive test component to said first switch within a second time;

comparing said state of said receive test component with a state of a send test component associated with said first switch to detect a network error; and wherein said steps of sending and replying include the step of changing a maximum count of a counter corresponding to the first and second times to thereby adjust said times in response to said state of said send test component.

11. The method of claim 10, wherein said message is sent to said second switch after a predetermined time interval.

12. The method of claim 10, further comprising the step of:

detecting said network error if said reply is not received by said first switch within a predetermined time interval.

13. The method of claim 10, wherein said first and second switches are torus switches.

14. The method of claim 10, further comprising the step of:

taking a predetermined action when said error is detected.

15. The method of claim 14, wherein said predetermined action is shutting down said network.

16. The method of claim 14, wherein said predetermined action is resetting said network.

17. The method of claim 14, wherein said predetermined action is notifying a network supervisor.

18. The method of claim 10, wherein said first switch has a first input/output link connecting said first switch to said second switch and said second switch has a second input/output link connecting said second switch to said first switch.

19. The method of claim 18, wherein said first input/output link has a first input link and a first output link and said second input/output link has a second input link and a second output link, said first output link connected to said second input link by a uni-directional connection and said second output link connected to said first input link by a uni-directional connection.

* * * * *